United States Patent
Moradians

(10) Patent No.: US 6,220,418 B1
(45) Date of Patent: Apr. 24, 2001

(54) BRAKING DEVICE FOR ROLLER CONVEYOR SYSTEM FOR HANDLING CARGO

(75) Inventor: Edward Moradians, Canoga Park, CA (US)

(73) Assignee: Ancra International, LLC., Hawthorne, CA (US)

( * ) Notice: Subject to any disclaimer, the term of this patent is extended or adjusted under 35 U.S.C. 154(b) by 0 days.

(21) Appl. No.: 09/432,719

(22) Filed: Nov. 2, 1999

(51) Int. Cl.[7] .................................................... B65G 13/00
(52) U.S. Cl. .......................................................... 193/35 A
(58) Field of Search .......................... 193/35 A; 198/534, 198/341.09

(56) References Cited

U.S. PATENT DOCUMENTS

| | | |
|---|---|---|
| 3,576,242 | 4/1971 | Mumma . |
| 3,917,044 * | 11/1975 | Brown .............................. 193/35 A X |
| 3,990,557 * | 11/1976 | Lardes ................................. 193/35 A |
| 4,000,796 * | 1/1977 | Bolton et al. ....................... 193/35 A |
| 4,089,399 | 5/1978 | Webb . |
| 4,542,815 * | 9/1985 | Leemkuil ............................ 193/35 A |
| 4,600,093 | 7/1986 | Adams . |
| 5,147,020 | 9/1992 | Scherman et al. . |
| 5,168,976 * | 12/1992 | Kettelson ........................ 193/35 A X |
| 5,184,366 | 2/1993 | Rawdon et al. . |

* cited by examiner

*Primary Examiner*—James R. Bidwell
(74) *Attorney, Agent, or Firm*—Edward A. Sokolski

(57) ABSTRACT

A braking device for braking the motion of cargo in a roller system for use in loading and unloading cargo has its main frame mounted on the loading floor. An arm assembly having a pair of opposing arms is pivotally supported on a shaft supported on the main frame near the center thereof, this shaft extending transversely of the longitudinal axis of the frame. A substantially flat brake pad made of a friction material is pivotally supported on the arms on one side of the longitudinal axis of the shaft. A roller wheel is pivotally supported between the arms on the side of the longitudinal axis of the shaft opposite to that on which the brake pad is supported.

5 Claims, 3 Drawing Sheets

BRAKING DEVICE FOR ROLLER CONVEYOR SYSTEM FOR HANDLING CARGO

BACKGROUND OF THE INVENTION

1. Field of the Invention

This invention relates to a cargo handling system, and more particularly to a braking device for use in such a system for use in controlling cargo motion.

2. Description of the Related Art

Roller systems are commonly used for loading and unloading cargo. In many of such systems, braking devices are utilized to control the motion of the cargo both while it is being loaded and unloaded and when it reaches its loaded position. In the device described in U.S. Pat. No. 5,147,020 issued Sep. 15, 1999 to Scherman et al, continual friction is applied by means of a cylindrical locking shoe which contacts the roller. In U.S. Pat. No. 3,576,242 issued Apr. 27, 1971 to Mumma, a brake shoe device is described which contacts a brake drum to continually provide braking action which increases in response to centrifugal force generated as the speed of rotation increases. In U.S. Pat. No. 5,184,366 issued Feb. 9, 1993 to Rawdon et al. a system is described in which friction brakes extend above roller tines and engage such tines to provide braking action. Other devices are found in the prior art which employ inflatable air bags which are used to raise and retract the rollers.

None of such prior art devices provide a simple operation as does the device of the present invention wherein braking on the cargo is automatically provided at one level when the cargo is moved across the braking device in one direction and at a different level when the cargo is moved across the braking device in an opposite direction. The advantages of applicant's braking device accrue to its ability in a simple mechanism to automatically provide greater braking action on the cargo when it is moving in one direction(usually in a downhill direction) than when moving in the opposite direction(usually an uphill direction).

SUMMARY OF THE INVENTION

The device of the present invention has a main frame which is mounted on the loading floor of storage space into which cargo is conveyed. The main frame has a shaft near the center thereof which is supported on the frame between the opposite sides thereof with its longitudinal axis approximately normal to the longitudinal axis of the frame. The shaft is mounted on the frame in a vertical slot for limited vertical motion relative to the frame and urged upwardly in this slot by a spring. An arm assembly having a pair of opposing arm members is pivotally supported on the shaft. A flat brake pad of a friction material is mounted on the arm assembly on one side of the longitudinal axis of the shaft for limited pivotal motion. A roller wheel is pivotally supported on said arm assembly on the side of said shaft opposite said one side thereof. The roller wheel is supported for pivotal motion between predetermined upward and downward positions, there being stops in each of these positions preventing further motion.

The wheel is urged upwardly to its upward position by a spring and prevented from moving beyond this position by a stop on the arm assembly. The side of the arm assembly on which the wheel is mounted is urged upwardly on its pivotal support from the frame by a spring, the side of the arm assembly on which the brake pad is located being concurrently driven downwardly by the spring action to a position whereat the arm assembly abuts against the frame. A tensioning adjustment is provided on the shaft by means of a pair of cam members which abut against the shaft and are driven by springs. The tensioning action of the springs is adjusted by means of adjustment screws. Thus, the force exerted by the pad against the cargo can be varied, by the adjustment of the spring tension against the shaft.

When the cargo is driven against the roller wheel from the side on which the pad is located, the pad is driven to a first higher position to provide greater braking action. When the cargo is driven against the roller wheel and the pad from the direction on which the wheel is located, the roller wheel is driven inwardly against the action of its spring while the pad is retained in its at rest position by its spring action with the arm assembly on the brake pad side abutting against the frame. With the brake pad in its at rest lower position, little or no braking action is provided.

Thus, typically if the cargo is loaded in an uphill direction, the braking device is oriented so that the cargo will pass over the wheel first to provide little or no braking action. When the cargo is being unloaded in a downhill direction, the cargo will pass over the pad first to provide braking action thereby preventing the cargo from moving out of control.

It is therefore an object of this invention to provide an improved braking system in which braking action is automatically provided when moving in a first direction but not in an opposite direction.

It is a further object of this invention to provide a highly effective braking device for a conveyor system for loading and unloading cargo which is of simpler and more economical construction that braking systems of the prior art.

Other objects of the invention will become apparent as the description proceeds in connection with the accompanying drawings.

DETAILED DESCRIPTION OF THE INVENTION

Figure 1:
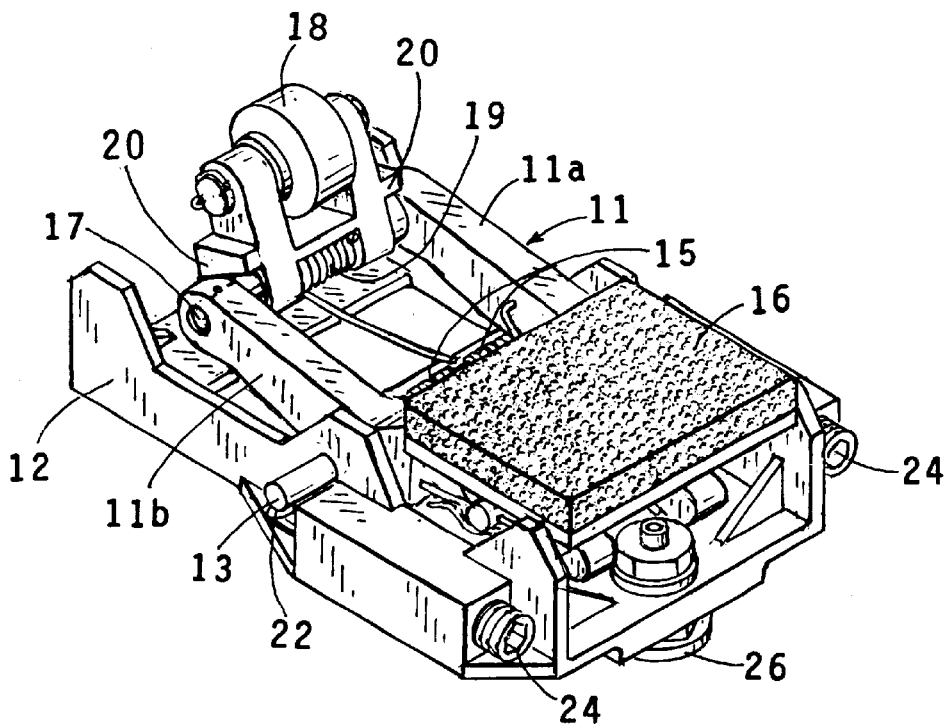
FIG. 1 is a top perspective view of a preferred embodiment of the invention.
Figure 2:
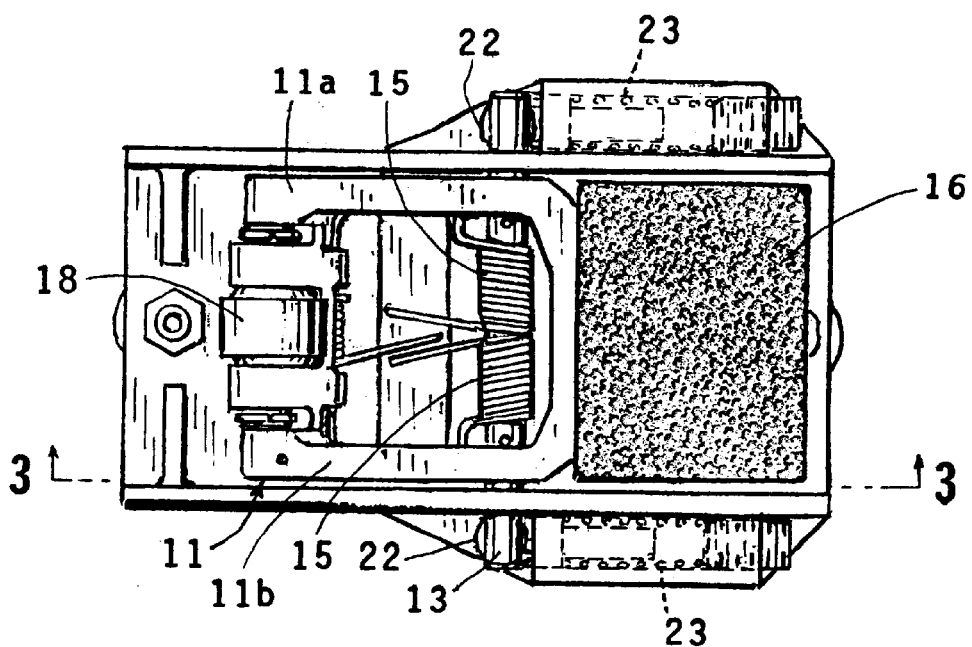
FIG. 2 is a top plan view of the preferred embodiment.
Figure 3:
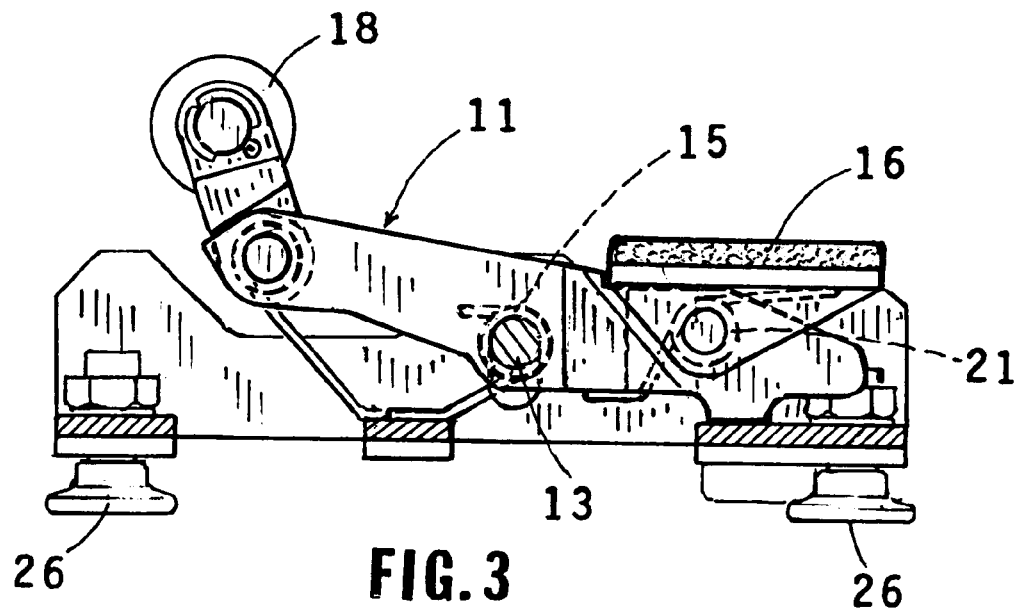
FIG. 3 is a cross sectional view taken along the plane indicated by 3—3 in FIG. 2.
Figure 4:
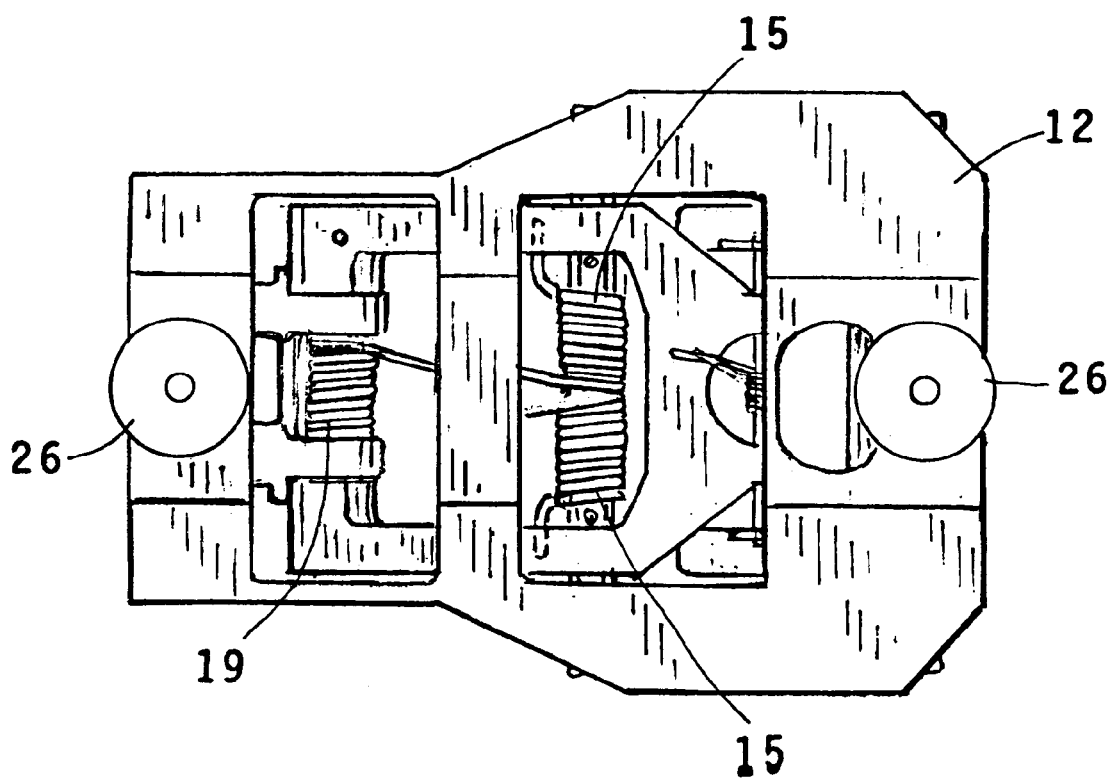
FIG. 4 is a bottom plan view of the preferred embodiment.
Figure 5:
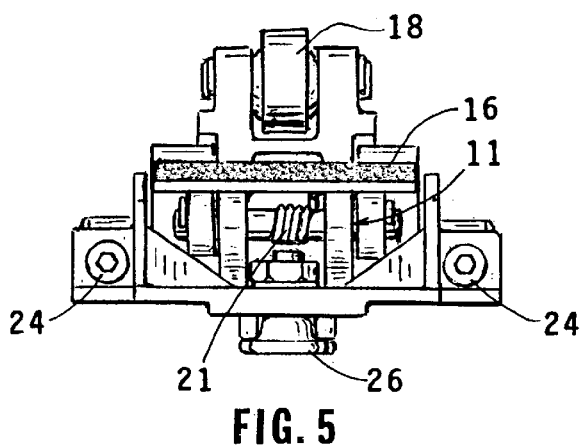
FIG. 5 is an end elevational view of the preferred embodiment.
Figure 6:
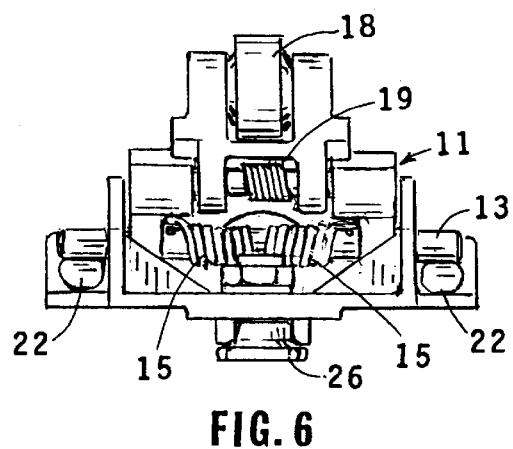
FIG. 6 is an end elevational view of the preferred embodiment taken from the side opposite to that of FIG. 5.

Referring now to FIGS. 1–6, a preferred embodiment of the invention is illustrated. Arm assembly 11 which has a pair of opposing arm members 11a and 11b is pivotally supported on main frame 12 on support shaft 13. Support shaft 13 is supported in elongated slots 11c (see FIG. 7) formed in the arm members and is urged upwardly against the ends of the slots by means of springs 15.

Supported for minimal pivotal motion on the arm assembly on one side of support shaft 13 is brake pad 16 which is made of a friction material of a suitable plastic. Brake pad 16 is urged to its upward, at rest position, by means of spring 21. Supported for pivotal motion on shaft 17 at the end of the arm assembly on the opposite side of the support shaft is rotatably supported wheel 18. Wheel 18 is urged to an upward position by means of spring 19, stop cams 20 being formed on the support for the wheel which abut against the arms 11a and 11b to prevent further upward motion of the wheel.

Cams 22 are urged against the opposite ends of shaft 13 of longitudinal slots 11c. The amount of tensioning provided by the springs against the shaft can be adjusted by means of adjustment screws 24. In this manner, the amount of braking action by the brake pad can be adjusted.

Posts 26 are provided on the base of the main frame for mounting the frame on a conventional floor rail used in aircraft.

Figure 7:
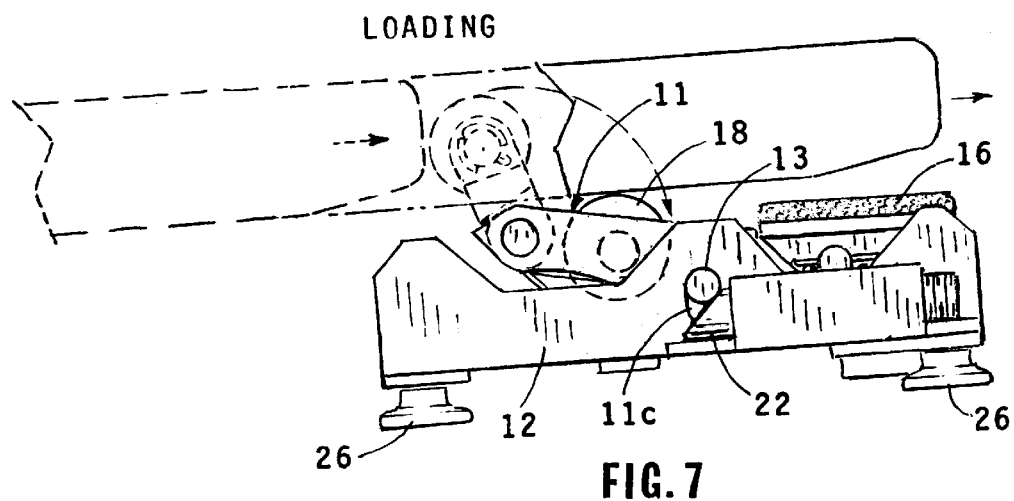
FIG. 7 is a side elevational view showing the preferred embodiment being used for loading cargo.
Figure 8:
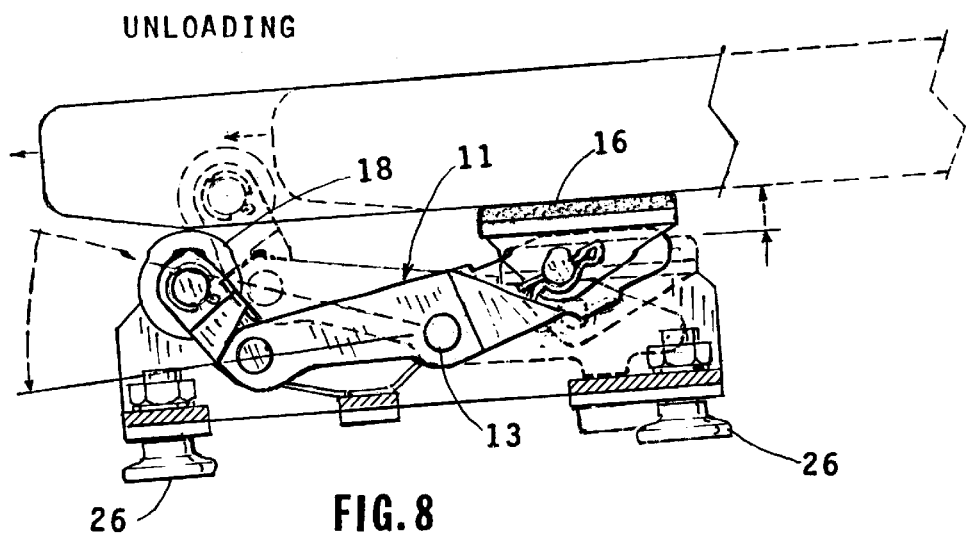
FIG. 8 is a side elevational view showing the preferred embodiment being used for unloading cargo.

Referring now to FIGS. 7 and 8, the operation of the device of the invention is illustrated. FIG. 7 illustrates loading on an uphill platform and FIG. 7 unloading on the same type of platform which is often found in aircraft holds.

As shown in FIG. 7, in loading, wheel 18 is driven to its downward position by the cargo with only slight if any downward drive of the arm assembly 11 thereby leaving pad 16 in its at rest position providing little braking action, if any, on the cargo.

As shown in FIG. 8, in unloading, from the brake pad side of the device, wheel 18 is driven downwardly to its lower position by the cargo and drives the arm assembly 11 downwardly on the wheel side of shaft 13. Pad 16 which is on the opposite side of shaft 13 is driven upwardly against the cargo to provide the desired braking action. As indicated previously, the degree of such braking action can be adjusted by means of adjustment screws 24 which is used to changed the tensioning on springs 23.

While the invention has been described and illustrated in detail, this is intended by way of illustration and example only, the scope of the invention being limited by the terms of the following claims.

I claim:

1. A braking device for use in a roller conveyor system for use in loading and unloading cargo onto a loading floor comprising:

a main frame mounted on said floor;

a support shaft mounted on said main frame near the center thereof, said shaft extending transversely of the longitudinal axis of said main frame, an arm assembly pivotally supported on said main frame;

a brake pad mounted on said arm assembly on one side of said shaft;

a roller wheel pivotally supported on said arm assembly on the side of said shaft opposite to said one side thereof, said roller wheel being supported for pivotal motion between predetermined upward and downward positions;

a first spring for urging said roller wheel towards its upward position;

a second spring for urging the arm assembly upwardly from the main frame on the side of the shaft on which the roller wheel is located;

whereby when the cargo is driven against the roller wheel from the side of the shaft on which the wheel is located, the roller wheel is driven to its downward position with the brake pad remaining in an at rest position to provide minimal braking action and when the cargo is driven against the roller wheel from the side of shaft on which the brake pad is located, the roller wheel remains in its upward position in abutment against the frame assembly and drives the arm assembly and the brake pad upwardly on the side of the shaft on which the brake pad is located to bring the brake pad upward against the cargo to effect braking action thereon.

2. The device of claim 1 wherein the frame has elongated slots in which the shaft is mounted, a pair of cams abutting against said shaft on each end thereof, and spring means for providing tension against said cams, whereby said cams drive said shaft upwardly in said slots in response to said tension.

3. The device of claim 2 and further including means for adjusting the tension of said spring means against said cams.

4. The device of claim 3 and further including screw means for adjusting the tension of said spring means.

5. The device of claim 1 wherein said arm assembly has a pair of opposing arms between which the shaft is supported.

* * * * *